UNITED STATES PATENT OFFICE.

J. A. SABBATON, OF ALBANY, NEW YORK.

IMPROVEMENT IN PURIFYING COAL-GAS.

Specification forming part of Letters Patent No. 7,534, dated July 30, 1850.

*To all whom it may concern:*

Be it known that I, JOSEPH A. SABBATON, of Albany, in the county of Albany and State of New York, have invented certain Improvements in the Purification of Carbureted-Hydrogen Gas; and I do hereby declare that the following is a full, clear, and exact description of the principle or character which distinguishes them from all other things before known, and of the usual manner of making, modifying, and using the same.

In order more fully to explain the nature of my said improvement I proceed to describe the mode now in general use—that is to say, the gas generated in the retorts of gas-works, after being washed, condensed, and cooled, is in its progress toward the gasometer, made to pass through a number of boxes, called "purifying-boxes," in each one of which there are several tiers or shelves, made either of iron-plate perforated with holes or of ozier twigs, on which shelves is laid a bed or strata of hydrate of lime to the depth of from one to two and a half inches, and through which the gas has to force itself a passage, in doing which it comes in contact with the lime, is purified, and fit for burning, but is still contaminated with ammonia and some other impurities which cannot be removed by these means.

My improvement consists in that instead of using lime alone I use a mixture of lime and coke - dust, (technically called "breeze," an article now thrown away as useless,) or in its stead charcoal-dust, or any other substance of that nature, the object being thereby to produce a separation of the particles of lime, by which means a greater number of them are exposed to the action of the gas, and, besides this mechanical action, the carbonaceous matter exerts a chemical action on the ammonia and other impurities contained in the gas and separates them from it, and I have ascertained by experiment on a large scale, and during several months' practice, that from one-half to two-thirds more gas can be purified by the mixture than when lime alone is used, thereby making a proportional saving in the quantity of lime used. It also lessens the pressure upon the retorts by reason of the mixture not offering so great a resistance to the gas as the solid body of hydrate of lime when used alone. Consequently the accumulation of the carbonaceous deposit in the retorts will not be so rapid nor so great, which will cause them to last for a longer time.

I do not confine myself to any definite proportion in the quantity of ingredients in the mixture, as that will in a great measure depend on the quality of coal from which the gas is obtained, and must be tested by experiment, nor to the precise nature of the ingredient mixed with the lime, as other carbonaceous substances than those I have named may answer equally as well; but I prefer using coke-dust or breeze, which is to be sifted through sieves having meshes not larger than one-fourth of an inch square, and I prefer as a general rule to use one bushel of the breeze thus sifted with one bushel of lime, both to be intimately mixed together and brought to the same state of moisture as the lime alone is in the ordinary way. When thus prepared the same quantity of the mixture is used on the tiers or shelves as when lime alone is used, and to be laid on the usual depth. The breeze which I use has a chemical affinity for the ammonia held by the gas in its passage through the purifier. It is then taken up by my mixture, and a purer gas is evolved from the purifier than when lime alone is used, or by mixing moss with the lime, which has no effect upon the quality of the gas whatever, and is used only to keep the lime from packing together in heavy masses.

Having thus fully described the nature of my improvement in the method of purifying carbureted - hydrogen gas for the purpose of lighting, I do hereby declare that I do not make any claim to the use of hydrate of lime alone, or its mixture with moss or other substance for the new mechanical separation of its particles for the purification of carbureted -hydrogen gas; but

What I do claim as my invention, and desire to secure by Letters Patent, is—

The mixture with lime of coke-dust or breeze, charcoal - dust, or other carbonaceous substances for the purposes of acting mechanically in the separation of the particles of lime, and at the same time acting chemically in removing various impurities from the gas, which cannot be separated by the ordinary methods of purifying gas, substantially as above set forth.

JOS. A. SABBATON.

Witnesses:
R. MERRIFELD,
A. T. SABBATON.